United States Patent Office 2,755,880
Patented July 24, 1956

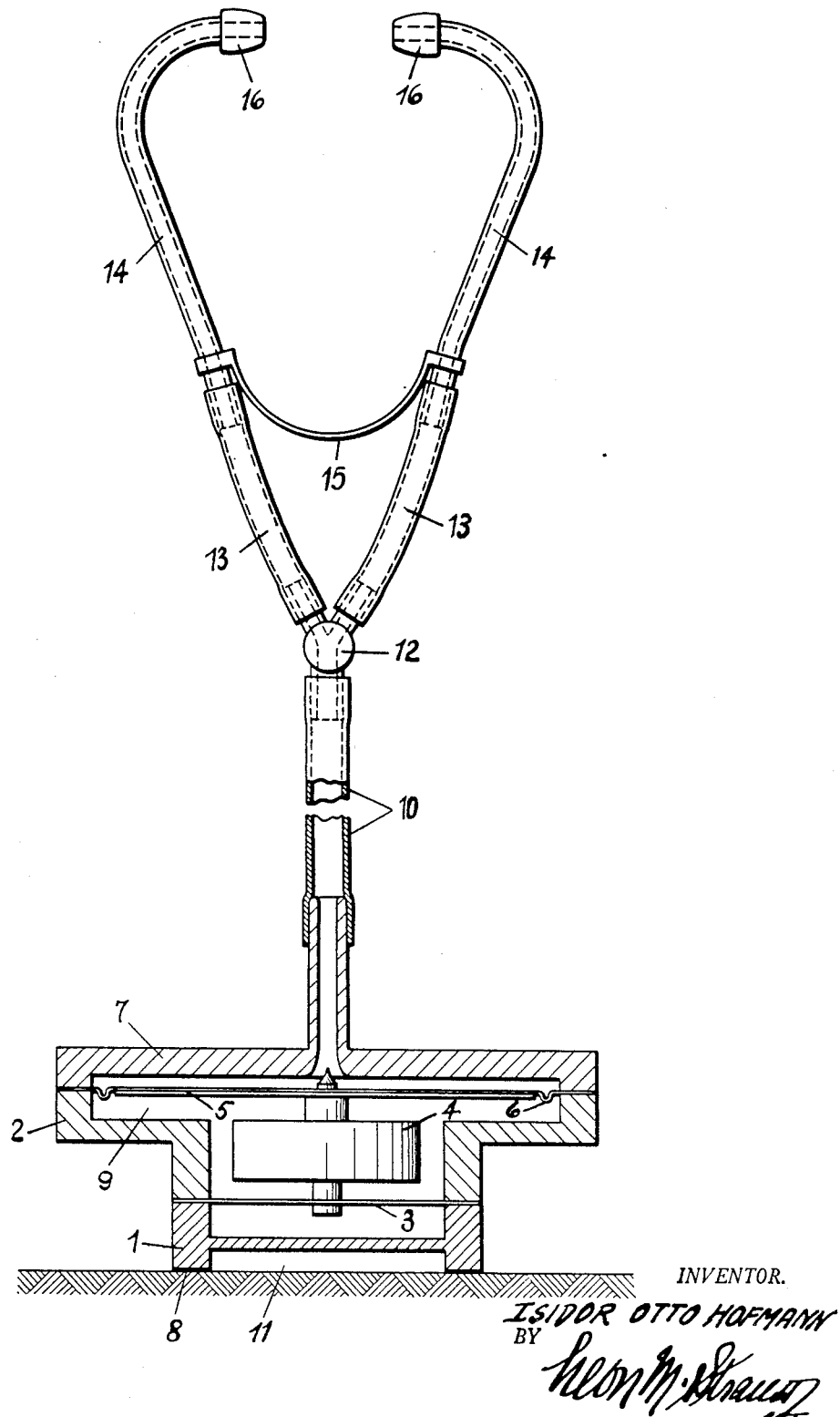

2,755,880
ACOUSTIC DEVICES
Isidor Otto Hofmann, Littau, Switzerland
Application August 18, 1954, Serial No. 450,716
Claims priority, application Switzerland August 20, 1953
4 Claims. (Cl. 181—24)

This invention relates to acoustic devices, and more particularly to such devices adapted for testing fluid-conducting pipes, determining the locations of underground streams, and like operations.

In addition to known stethoscopes for medical investigations, various constructions of acoustic devices for testing machines, for example engines, and for testing water pipes and gas pipes, for investigations of the ground with regard to the presence and the course of streams and other purposes have become known. The simplest acoustic devices known consist of a contact rod which is placed on a part of the machine to be examined, on a water pipe or a gas pipe, or on the ground to be examined, and a sound box arranged on its top end, whilst, for example, Ambronn's geophone has a sound box with a tuned diaphragm and a flexible pipe with one or two earpieces for transmitting the received sound vibrations to one or both ears of the user of this geophone. These known acoustic devices produce a comparatively low sound pressure, since the diaphragm, which is rigidly clamped at the edge, can carry out considerable vibrations only in its central part and over an area of comparatively small diameter. Consequently, certain sound vibrations are not audibly transmitted to the ear or ears of the user. This disadvantage is very largely obviated by the present invention.

Acoustic devices with electrical amplifiers are known, in which the received sound vibrations are amplified electrically. However, such acoustic devices are complicated and are dependent upon a source of current. Owing to their weight and their sensitivity to external influences, such acoustic devices with electrical amplifiers are suitable only for special purposes and the proper handling of these devices requires special study. The present invention, however, relates to acoustic devices without electrical amplification.

The subject matter of the present invention is an acoustic device, especially for the testing of water pipes, which possesses a casing that consists of a base, a cylinder and an upper part, there being clamped between the base and the cylinder a vibratable member which carries a slowly movable mass with which is rigidly connected a rigid disc which, in conjunction with a flexible sealing ring arranged thereon and clamped between the top edge of the cylinder and the top part of the casing, shuts off the interior of the cylinder from the interior of the top part of the casing, and the interior of the top part of the casing being adapted to communicate with the ear or ears of the user through a transmitting tubing.

This acoustic device can be tuned to a particular range of frequencies by suitably choosing the size of the slowly movable mass.

In the testing of water pipes and in searching for damage in them, the acoustic device need not be brought into direct contact with the water piping in question, but it is sufficient if it is put on the ground in the vicinity of this water piping. Noises from water pipes, which are laid at a depth of 2 metres or more, can still be very easily noticed and it is possible for the expert to localize rapidly and accurately damage to such piping. With a suitable choice of the size of the slowly movable mass and of the empty spaces in the casing of the acoustic device, the acoustic device can be made usable for other purposes, for example for searching for and determining the course of subterranean streams and watercourses.

An example of embodiment of acoustic device, especially for the testing of water pipes, according to the invention, is represented in the accompanying drawing.

As shown in the drawing, the device consists of a casing having a base 1 and a cylinder 2 which is securely put thereon and which has a bottom part of smaller diameter and a top part of larger diameter and which contains the vibratory system. The vibratory system, which is arranged in the bottom, narrower part of the cylinder 2, consists of a vibratable member, for example a spring band, a string or, as represented, a diaphragm 3, which carries a slowly movable or inertia mass 4. A rigid transmitting disc 5, having a larger diameter than the mass-supporting diaphragm 3, is rigidly connected with the slowly movable mass. A flexible sealing ring 6, which is arranged on the periphery of the transmitting disc 5 and which is inserted between the top edge of the cylinder 2 and a top part 7 of the casing that is put securely on said top edge, tightly shuts off in conjunction with the disc 5 the interior 9 of the cylinder 2 from the interior of the top part 7 of the casing. The flexible ring 6 is so dimensioned and positioned in the casing that it is relatively flaccid. Thus, the ring not only performs no centering function with respect to the disc 5, but it is substantially incapable of damping the motions of the vibratory system 3—4. The base 1 of the casing has a contact surface 8 and effects the transmission of sound from the ground or the article being examined. The top part 7 of the casing has, at the centre, a tubular extension on which a flexible tube 10 is fitted. Connected to this tube 10 is a Y-shaped branched member 12, on the branchings of each of which a flexible tube 13 is fitted. A listening tube 14 is connected to each of the two flexible tubes 13. These two listening tubes 14 are connected together by a spring bow 15 and their ends, which are bent towards each other, are each provided with an earpiece 16, in such a manner that the two listening tubes can be applied to the two sides of the head of the user and, by means of the spring bow 15, kept resiliently resting, with the earpieces 16, on the ears of the user. Advantageously, for the better transmission of the sound waves from the ground, a downwardly open empty space 11 is provided in the base 1 of the casing. This empty space 11 also facilitates the placing of the acoustic device on uneven ground.

The sound vibrations, which are received by the base 1 of the casing, are transmitted to the vibratable member, for example to the diaphragm 3, a selective effect being obtained by suitable choice of the size of the slowly movable mass, so that, principally, vibrations of a certain frequency, for example of 50 to 300 cycles per second, are received on testing water pipes and looking for damage thereto. By means of the slowly movable mass 4, the vibrations of the diaphragm 3 are transmitted to the rigid transmitting disc 5, which, therefore, vibrates at a frequency and with an amplitude corresponding to the frequency and maximum amplitude of vibration of the diaphragm 3 and, in turn, vibrates the column of air in the top part 7 of the casing and in the flexible tube 10. Since the rigid transmitting disc 5, the diameter of which is almost equal to that of the space 9 in the casing, carries out vibrations of equal amplitude with the whole of its surface and, because of its relatively large diameter with respect to the tubular extension of the casing top 7, acts as it were, as a piston, comparatively high sound pressures are produced in the top part 7 of the casing, especially when, as represented in the drawing, the rigid transmitting disc also has a greater diameter than the interior of the bottom part of the cylinder 2. The sound pressures produced may be about 30% greater than is the case with the known acoustic devices, and it is thus rendered possible to make noises distinctly audible which were impossible to notice with the known acoustic devices.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. An acoustic device comprising a casing, said casing consisting of a base, a cylinder resting on said base and having a narrow lower portion and a wider upper portion, and a top part resting on said upper portion and having substantially the same width as the latter, a vibratable member clamped between said base and said cylinder, a slowly movable mass carried by said vibratable member, a rigid disc having a diameter smaller than but approximating that of said upper portion and rigidly connected with said slowly movable mass, a flexible sealing ring on said disc and clamped between the top edge of said upper portion of said cylinder and said top part of said casing, said rigid disc and said sealing ring shutting off the interior of said cylinder from the interior of said top part of said casing, and tube means communicating with the interior of said top part of said casing and adapted to communicate with at least one ear of the user of said device.

2. An acoustic device comprising a casing, said casing consisting of a base, a cylinder and a top part, a vibratable member clamped between said base and said cylinder, a slowly movable mass carried by said vibratable member, a rigid disc rigidly connected with said slowly movable mass, said cylinder having a top portion and a bottom portion with the latter having a smaller diameter than said top portion and said rigid disc having a greater diameter than said bottom portion of said cylinder, a flexible sealing ring on said disc and clamped between the top edge of said cylinder and said top part of said casing, said rigid disc in conjunction with said sealing ring shutting off the interior of said cylinder from the interior of said top part of said casing, and tube means communicating with the interior of said top part of said casing and adapted to communicate with at least one ear of the user of said device.

3. An acoustic device comprising a casing, said casing consisting of a base having a bottom defining a downwardly open empty space, of a cylinder and of a top part, a vibratable member clamped between said base and said cylinder, a slowly movable mass carried by said vibratable member, a rigid disc rigidly connected with said slowly movable mass, a flexible sealing ring on said disc and clamped between the top edge of said cylinder and said top part of said casing, said rigid disc in conjunction with said sealing ring shutting off the interior of said cylinder from the interior of said top part of said casing, and tube means communicating with said interior of said top part of said casing and adapted to communicate with at least one ear of the user of said device.

4. An acoustic device comprising a casing, said casing consisting of a base having a bottom defining a downwardly open empty space, of a cylinder and of a top part, a vibratable member clamped between said base and said cylinder, a slowly movable mass carried by said vibratable member, a rigid disc rigidly connected with said slowly movable mass, said cylinder having an upper portion and a lower portion with the latter having a smaller diameter than said upper portion, said rigid disc being located in said upper portion and having a greater diameter than said lower portion of said cylinder, a flexible sealing ring on said disc and clamped between the top edge of said cylinder and said top part of said casing, said rigid disc together with said sealing ring shutting off the interior of said cylinder from the interior of said top part of said casing, and tube means communicating with said interior of said top part of said casing and adapted to communicate with at least one ear of the user of said device.

References Cited in the file of this patent

UNITED STATES PATENTS 1,738,094  Caldwell et al. _____ Dec. 3, 1929